US006542700B2

United States Patent
Ito (10) Patent No.: US 6,542,700 B2
(45) Date of Patent: Apr. 1, 2003

(54) CAMERA HAVING A FRONT COVER (75) Inventor: Toru Ito, Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 09/818,619

(22) Filed: Mar. 28, 2001

(65) Prior Publication Data
US 2001/0026689 A1 Oct. 4, 2001

(30) Foreign Application Priority Data
Mar. 30, 2000 (JP) .......................... 2000-093224

(51) Int. Cl.[7] .............................. G30B 17/02
(52) U.S. Cl. ........................................ 396/535
(58) Field of Search ...................... 396/541, 535, 396/29, 6, 373

(56) References Cited

U.S. PATENT DOCUMENTS 5,028,943 A * 7/1991 Ishii et al. ............... 396/176
5,708,897 A 1/1998 Manabe et al.
5,708,898 A * 1/1998 Manabe et al. ........... 396/535
5,708,901 A * 1/1998 Manabe .................. 396/541
5,897,234 A * 4/1999 Tanaka ................... 396/440

* cited by examiner

Primary Examiner—David M. Gray
Assistant Examiner—Michelle Nguyen
(74) Attorney, Agent, or Firm—Young & Thompson (57) ABSTRACT A front cover of a camera is constituted of two parts, namely a base member and a cover plate. The base member comprises a frame portion, a grip portion and a support portion. The frame portion is formed so as to surround side faces of a camera body. The support portion supports a part of the inside of the cover plate. A front face of the base member is adapted to be an opening except the grip portion and the support portion. The cover plate is attached to the base member so as to cover the opening. An overlapping portion of the cover plate and the base member is a little so that a thickness of the front cover is prevented from increasing.

19 Claims, 6 Drawing Sheets

CAMERA HAVING A FRONT COVER

BACKGROUND OF THE INVENTION

1. Field of the Invention

The present invention relates to a camera having a front cover which is attached to a main body of the camera including a photographing mechanism.

2. Description of the Related Art

Various compact cameras are put in a market and are diversified as to not only its functions but also its design regarding a shape and a color thereof. In view of such a tendency, it is considered to divide a front cover attached to a main body, in which a photographing mechanism is incorporated, into two parts. By constituting the front cover in this way., is improved degree of freedom for external design concerning a color, a shape and so forth.

For example, a camera described in U.S. Pat. No. 5,708,898 (counterpart of Japanese Patent Laid-Open publication No. 9-211627) includes a front cover constituted of two parts which are an inner frame and a decorative cover plate. The inner frame is made of plastic on account of its workability and easy attachment. The decorative cover plate is made of a metal having superior texture and is attached to an outer face of the inner frame. This inner frame is provided with a frame member, a grip portion and so forth. The frame member is formed so as to surround a main body of the camera and is directly attached to the main body. The grip portion is for holding the camera. A front face of the inner frame is formed with openings for baring a taking lens, a viewfinder, a flash unit and so forth. The outside of the inner frame and the inside of the cover plate are formed in a similar shape except the grip portion to be joined with each other. The cover plate is attached to the outside of the inner frame so as to be superimposed thereon. For this reason, the cover plate is also formed with openings corresponding to the openings of the inner frame.

By constructing the front cover with two parts in the above way, the degree of freedom for external design is improved. At the same time, sufficient strength required of the front cover is secured by superimposing the two parts.

However, superimposing the two parts means increase of a thickness of an overlapping portion so that it is obstructed to reduce a size (depth) of the camera. In other words, it is likely to lose basic characteristics of compactness inherent in the compact camera.

SUMMARY OF THE INVENTION

In view of the foregoing, it is a primary object of the present invention to provide a camera having high degree of freedom for its external design.

It is a second object of the present invention to provide a camera whose size may be reduced.

In order to achieve the above and other objects, the camera according to the present invention comprises a front cover which is attached to a front face of a main body including a photographing mechanism. The front cover is formed with openings for baring a taking lens, a viewfinder, a flash unit and so forth.

The front cover comprises a cover member and a base member. The cover member is formed with the respective openings and is attached to the base member constituted of a frame portion and a support portion. The frame portion is formed so as to surround the side faces of the main body. The support portion includes a supporting region for supporting the cover member. The supporting region abuts on a part of the inside of the cover member.

The almost whole front face of the base member is adapted to be an opening. Owing to this, the base member and the cover member are prevented from overlapping with each other except the supporting region. Hence, a thickness of the front cover may be reduced so that the camera may be downsized.

Meanwhile, since the front cover is constituted of the two parts, degree of freedom for external design of the camera may be improved.

BRIEF DESCRIPTION OF THE DRAWING

The above objects and advantages of the present invention will become apparent from the following detailed description of the preferred embodiments of the invention when read in conjunction with the accompanying drawings, in which.

DETAILED DESCRIPTION OF THE PREFERRED EMBODIMENT (S)

Figure 1:
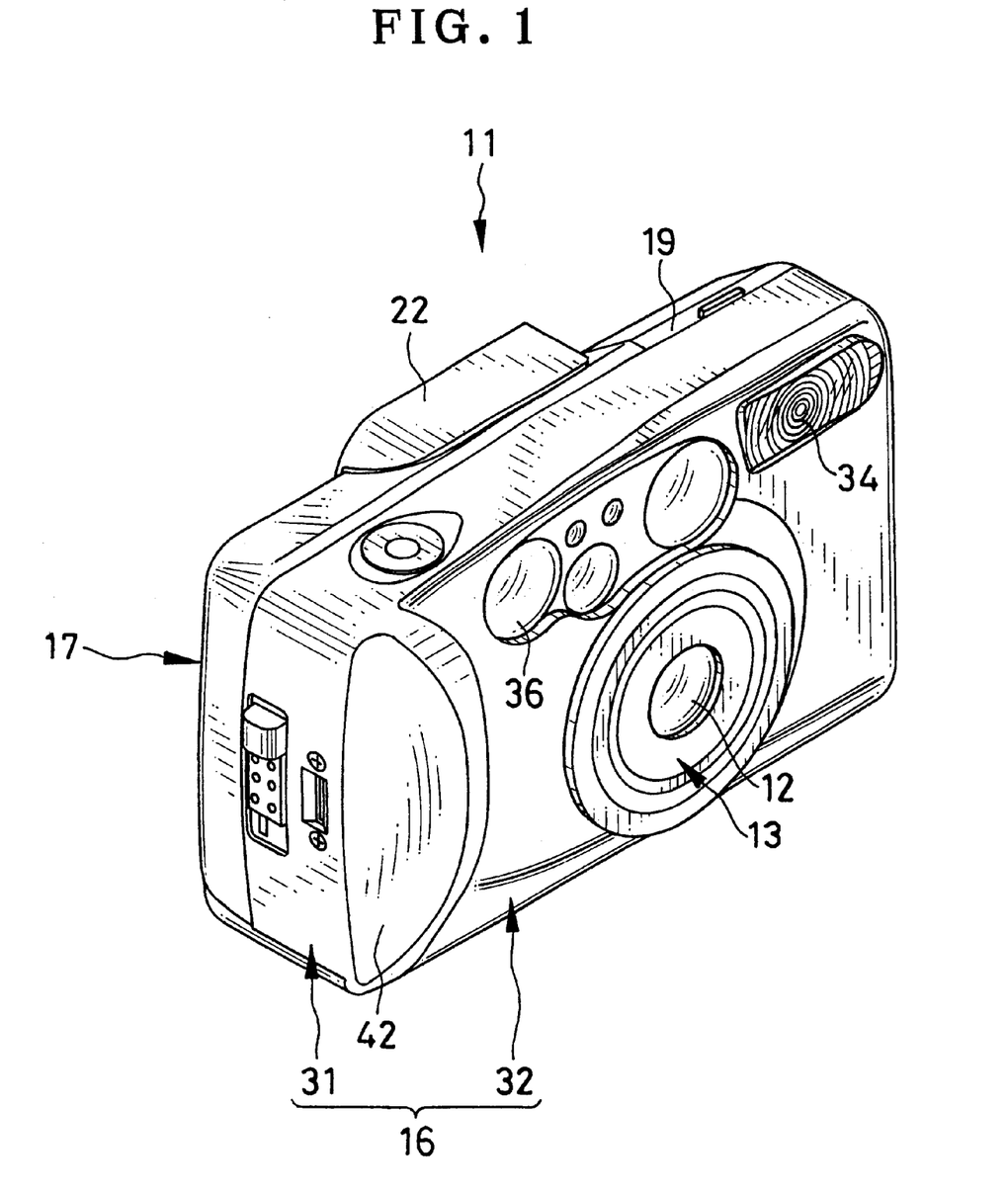
FIG. 1 is a perspective view of a camera.
Figures 2A, 2B:
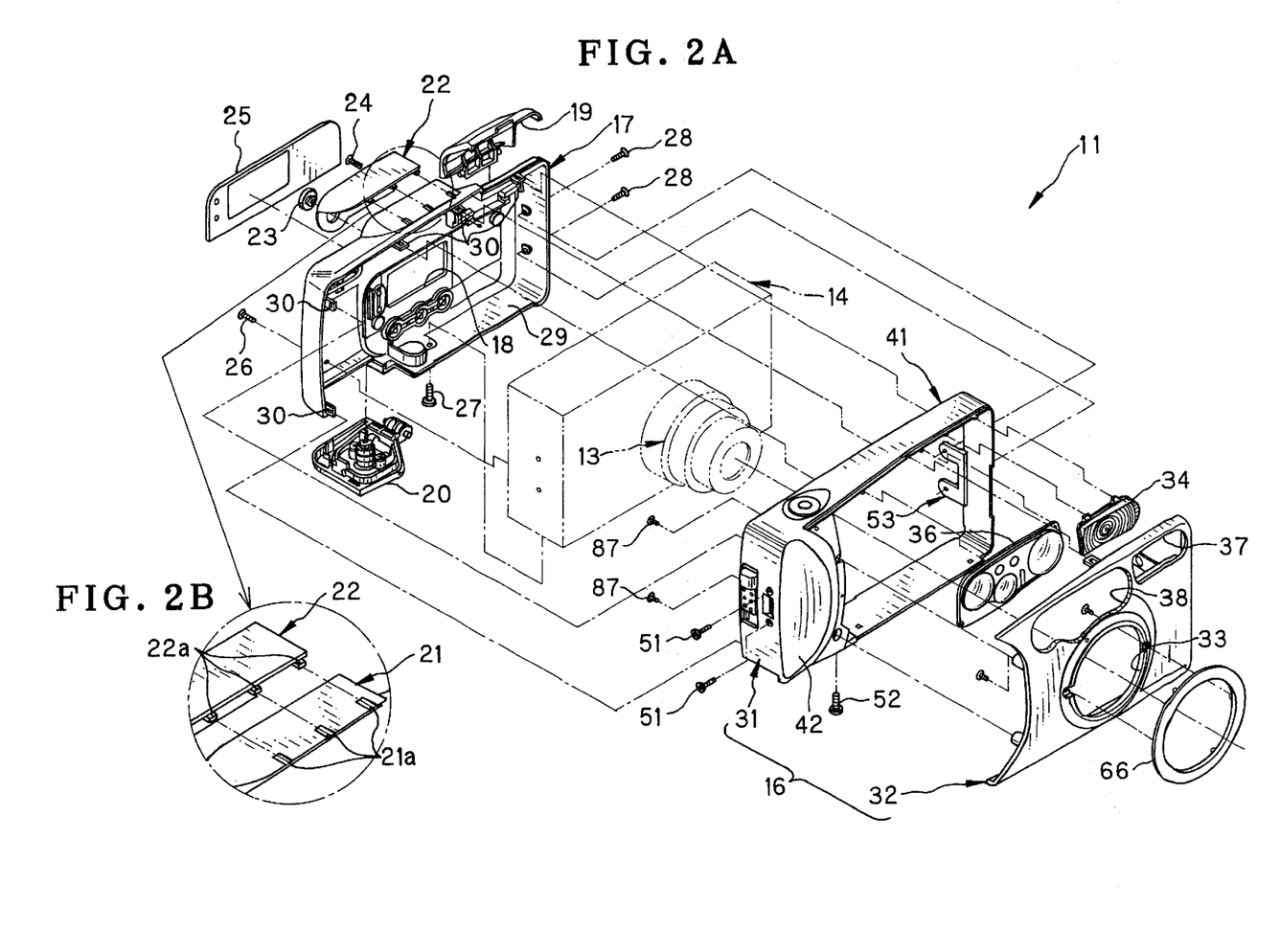
FIG. 2A is an exploded perspective view of the camera.
FIG. 2B is a partially enlarged view of FIG. 2A.

As shown in FIGS. 1, 2A and 2B, a camera 11 comprises a main body 14, a front cover 16 and a rear cover 17. In the main body 14, is incorporated a photographing mechanism including a lens barrel 13 for containing a taking lens 12, a viewfinder mechanism, a flash device, a shutter mechanism, a film advancing mechanism and so forth. The main body 14 is covered with the front cover 16 and the rear cover 17 from the front and the back thereof respectively. The front cover 16 and the rear cover 17 are formed from plastic on account of easy fitting and light weight.

The rear cover 17 is formed with various openings, for example, an opening 18 for baring a liquid crystal panel attached to a rear face of the main body 14, and openings for baring a viewfinder eyepiece, a power switch, a zoom switch and so forth. A cover 19 for covering a flash unit is attached to an upper portion of the rear cover 17. A lid 20 opened for removing a cartridge is attached to a lower portion of the rear cover 17.

A central-upper portion of the rear cover 17 is provide with a protrusion 21 for containing a viewfinder unit. A rear face of the protrusion 21 is formed with an opening for baring the viewfinder eyepiece. An eyepiece cover 22 for covering the protrusion 21 is attached thereto.

The eyepiece cover 22 is formed with a window through which the viewfinder eyepiece emerges. Moreover, an operation member 23 for changing a finder visual frame is attached to the eyepiece cover 22. A front edge of the eyepiece cover 22 is provided with claws 22a. Meanwhile, an upper portion of the protrusion 21 is formed with grooves 21a for engaging with the claws 22a, and a hole into which the top of the claw 22a enters. The claw 22a engages with both of the groove 21a and the hole to position the eyepiece cover 22. The eyepiece cover 22 is joined to the rear cover 17 with an adhesive and is fixed by a screw 24. Reference numeral 25 denotes a protect cover for protecting the liquid crystal panel. The protect cover 25 is made of transparent plastic and is joined to the rear cover 17 with an adhesive.

Three portions of the rear cover 17, namely a rear portion, a bottom portion and a right-side portion, are fixed to the main body 14 by screws 26, 27 and 28 respectively. Among these portions, the rear portion and the bottom portion are fixed such that inner faces thereof directly contact with an outer face of the main body 14.

As to an opening 29 of the rear cover 17, the periphery thereof is provided with claw receiving portions 30 for engaging with claws (not shown) formed on the front cover 16. In virtue of engagement of the claw and the claw receiving portion 30, the front cover 16 and the rear cover 17 are positioned and coupled. Further, this engagement prevents the front cover 16 and the rear cover 17 from being unfastened after coupling.

Figure 3:
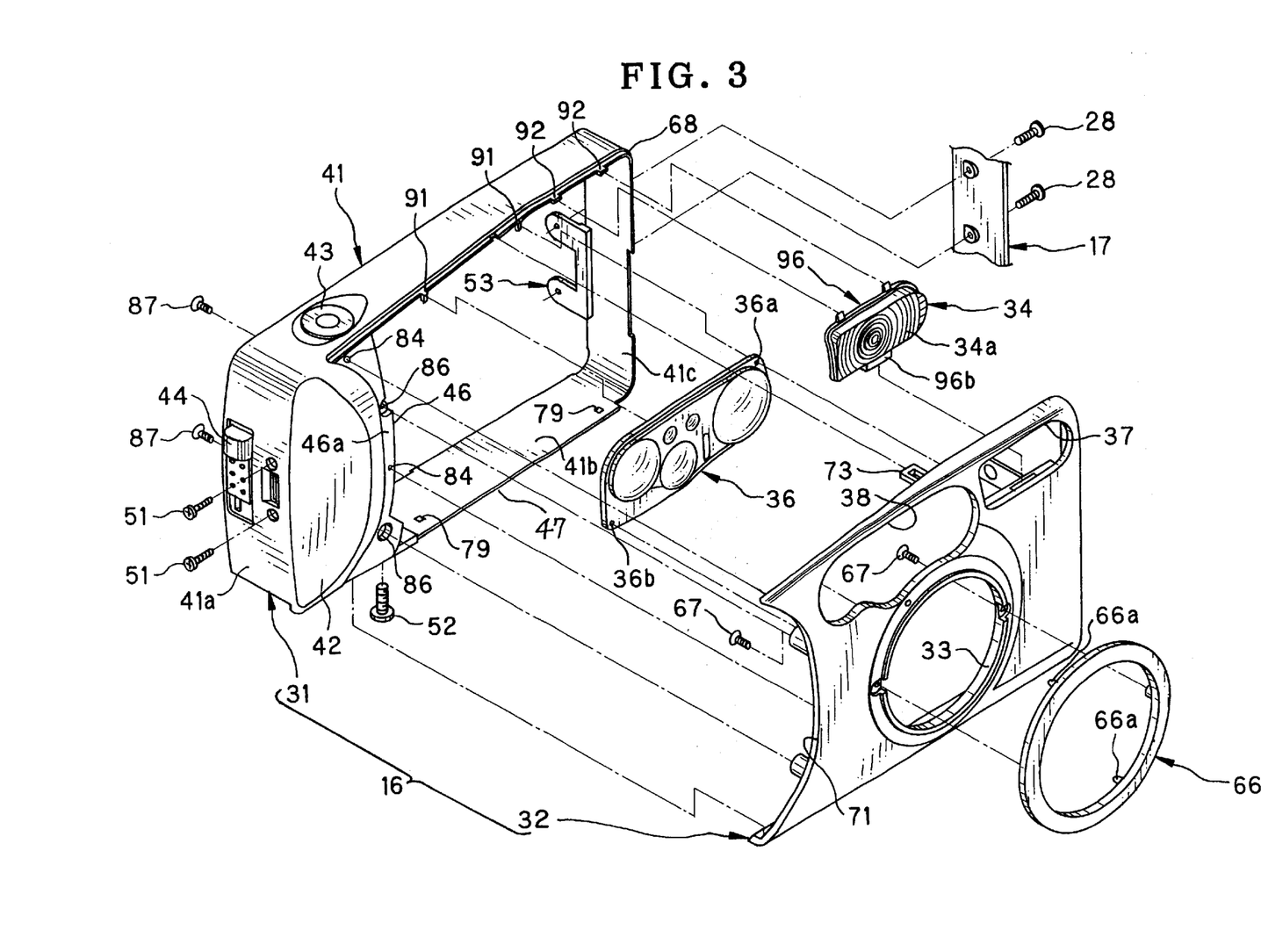
FIG. 3 is an exploded perspective view of a front cover.
Figure 4:
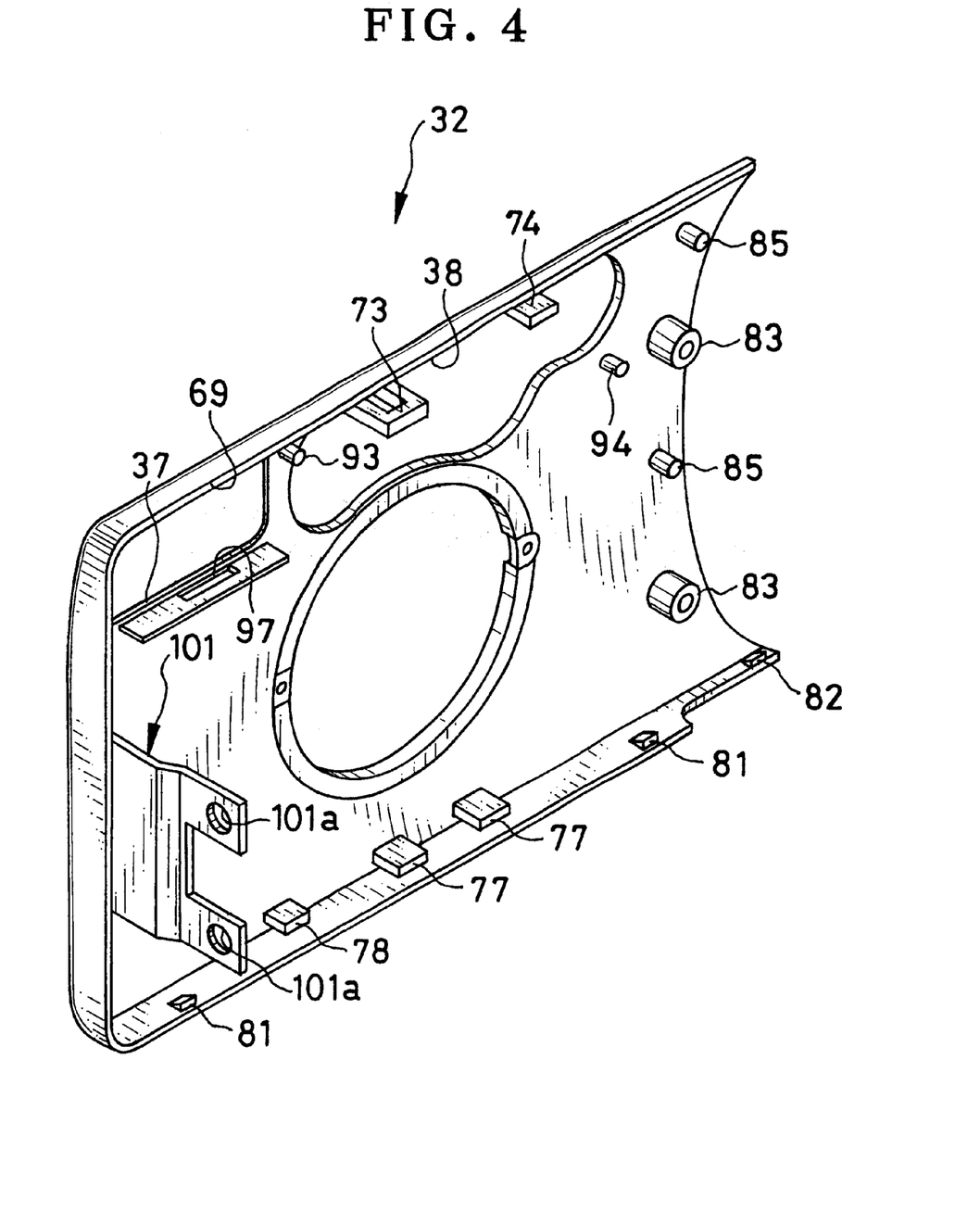
FIG. 4 is a perspective rear view of a cover plate.

As shown in FIGS. 3 and 4, the front cover 16 comprises a base member 31 and a cover plate 32. The cover plate 32 is formed with an opening 33 for the zoom lens barrel 13, an opening 37 for a diffusion plate 34 of the flash device, and an opening 38 for a viewfinder cover 36. In the present embodiment, both of the base member 31 and the cover plate 32 are made of plastic. Either of them, however, may be made of a metal, for example. When a metal having high texture is used, it is possible to have the camera 11 own a quality feeling. Meanwhile, by using the plastic for making one of the base member 31 and the cover plate 32, easy fitting may be secured so that fitting them is prevented from being difficult, even if a metal is used for making the other of them.

The viewfinder cover 36 is formed from transparent plastic to cover an objective viewfinder lens. Besides this lens, the viewfinder cover 36 integrally covers light emitting/receiving units used for photometry and measurement of a distance. A film for light shielding is adhered to a rear face of the viewfinder cover 36. Owing to this film, the light is shielded except portions corresponding to the objective viewfinder lens and the light emitting/receiving units. Thus, the inside of the camera 11 is adapted not to be seen from the outside.

The base member 31 is constituted of a frame portion 41 and a support portion 46. The frame portion 41 is formed so as to surround the sides of the camera 11. The support portion 46 is provided with a supporting region 46a which abuts on a part of the rear face of the cover plate 32 to support the cover plate 32. A shutter button 43 is attached to an upper face of the frame portion 41, and an operation member 44 used for removing the cartridge is attached to a side face 41a thereof. A grip 42 for holding the camera 11 is provided at the left of the frame portion 41, viewing from the front thereof. The support portion 46 is provided at a side of the grip 42. Almost all the front face of the base member 31 is an opening 47 except the supporting region 46a and the grip 42 so that the front face of the main body 14 is almost bared through the opening 47. The cover plate 32 is attached to the base member 31 so as to cover the opening 47. In this way, except the supporting region 46a, the cover plate 32 and the base member 31 do not overlap with each other. Thus, a thickness of the front cover 16 may be reduced. Owing to this, a depth of the camera 11 may be shortened to downsize the camera 11. Meanwhile, the cover plate 32 is supported by the supporting region 46a so that the cover plate 32 is adapted not to be deformed due to a pressure from the front. Incidentally, in the present embodiment, the grip is provided on the base member. However, the grip may be provided on the cover plate for example.

The base member 31 is joined to the main body 14 by a screw to be fixed. The left side face 41a of the frame portion 41 in FIG. 3 is formed with holes through which screws 51 are tightened. The bottom face 41b of the frame portion 41 is formed with a hole through which a screw 52 is tightened. The base member 31 is fixed by the screws 51 and 52 such that the side face 41a and the bottom face 41b directly contact with the main body 14. A side face 41c opposite to the side face 41a is provided with a first connector 53 projecting backward. This first connector 53 is a base-member connecting flap relative to the main body 14 and is formed with a hole through which the screw 28 is inserted. By inserting the screw 28 into the hole, the first connector 53 is joined to the right side face of the main body 14.

A decorative ring 66 is attached to the periphery of the opening 33 of the cover plate 32. The decorative ring 66 contacts with an outer surface of the zoom lens barrel 13 to guide it when the lens barrel 13 is protruded and is collapsed. In view of this, the decorative ring 66 is positioned by positioning pins 66a and is fixed to the cover plate 32 with screws 67. Thus, the decorative ring 66 is prevented from being dislocated when the zoom lens barrel 13 is moved.

The periphery of the opening 47 of the base member 31 is provided with a ridge 68 extending along this periphery. The ridge 68 is formed so as to protrude toward the front and is fitted to a rear edge of the cover plate 32. Meanwhile, a right side face of the grip 42, viewing from the front of the grip 42, protrudes from the supporting region 46a toward the front. This right side face abuts on a left edge 71 of the cover plate 32 when the cover plate 32 is fitted to the base member 31. Thus, the cover plate 32 is adapted not to be laterally slid. In virtue of such fitting and abutment, the cover plate 32 is prevented from being dislocated.

The periphery of the cover plate 32 is bent so as to round toward the main body 14. A rear edge 69 of this periphery abuts on the periphery of the opening 47 of the base member 31. Since the periphery of the cover plate 32 is bent toward the main body 14, strength of the cover plate 32 increases. Incidentally, in this embodiment, three sides of the cover plate 32 among the periphery thereof are bent. However, it is not exclusive to bend all of the three sides. Any one of the three sides may be solely bent.

A rear upper portion of the cover plate 32 is provided with a claw receiving portion 73 and a chip 74. The claw receiving portion 73 engages with a claw (not shown) of the base member 31, and the chip 74 catches the ridge 68. A rear lower portion of the cover plate 32 is provided with chips 77 and 78 for catching the front of the bottom face 41b of the frame portion 41. Moreover, the lower portion of the cover plate 32 is provided with claws 81 and 82. The claw 81 engages with a hole 79 formed in the bottom face 41b, and the claw 82 engages with a cut portion (not shown) formed in the bottom of the grip 42.

The cover plate 32 is formed with two positioning pins 85 and two screw receiving portions 83 having a screw hole. The positioning pin 85 and the screw receiving portion 83 are arranged at a position corresponding to the supporting region 46a of the base member 31. The positioning pin 85 is inserted into a positioning hole 84 formed in the support portion 46. The screw receiving portion 83 is fitted to a fitting portion 86 formed in the support portion 46. The fitting portion 86 is formed with a hole into which a screw 87 is inserted so that the base member 31 and the cover plate 32 are fixed by the screws 87.

Owing to the above-mentioned engagement and fitting, the cover plate 32 is attached to the base member 31 and is fixed thereto with the screws. In this way, attachment is performed by a plurality of the engagement members and the screws so that the cover plate 32 is prevented from being dislocated and being unexpectedly unfastened, even if strong force is applied to the decorative ring 66 when the zoom lens barrel 13 is protruded and is collapsed.

An upper front edge of the frame portion 41 is provided with pressing portions 91 and 92 for pressing and fixing the diffusion plate 34 and the viewfinder cover 36 which are fitted into the respective openings 37 and 38 of the cover plate 32. The viewfinder cover 36 is attached to the cover plate 32 such that positioning pins 93 and 94 formed on the cover plate 32 are inserted into positioning holes 36a and 36b of the viewfinder cover 36. When the cover plate 32 is fitted to the base member 31, the pressing portion 91 presses the back of the viewfinder cover 36. Owing to this pressure, the viewfinder cover 36 is pressed against the cover plate 32 to be fixed thereto.

Figure 5:
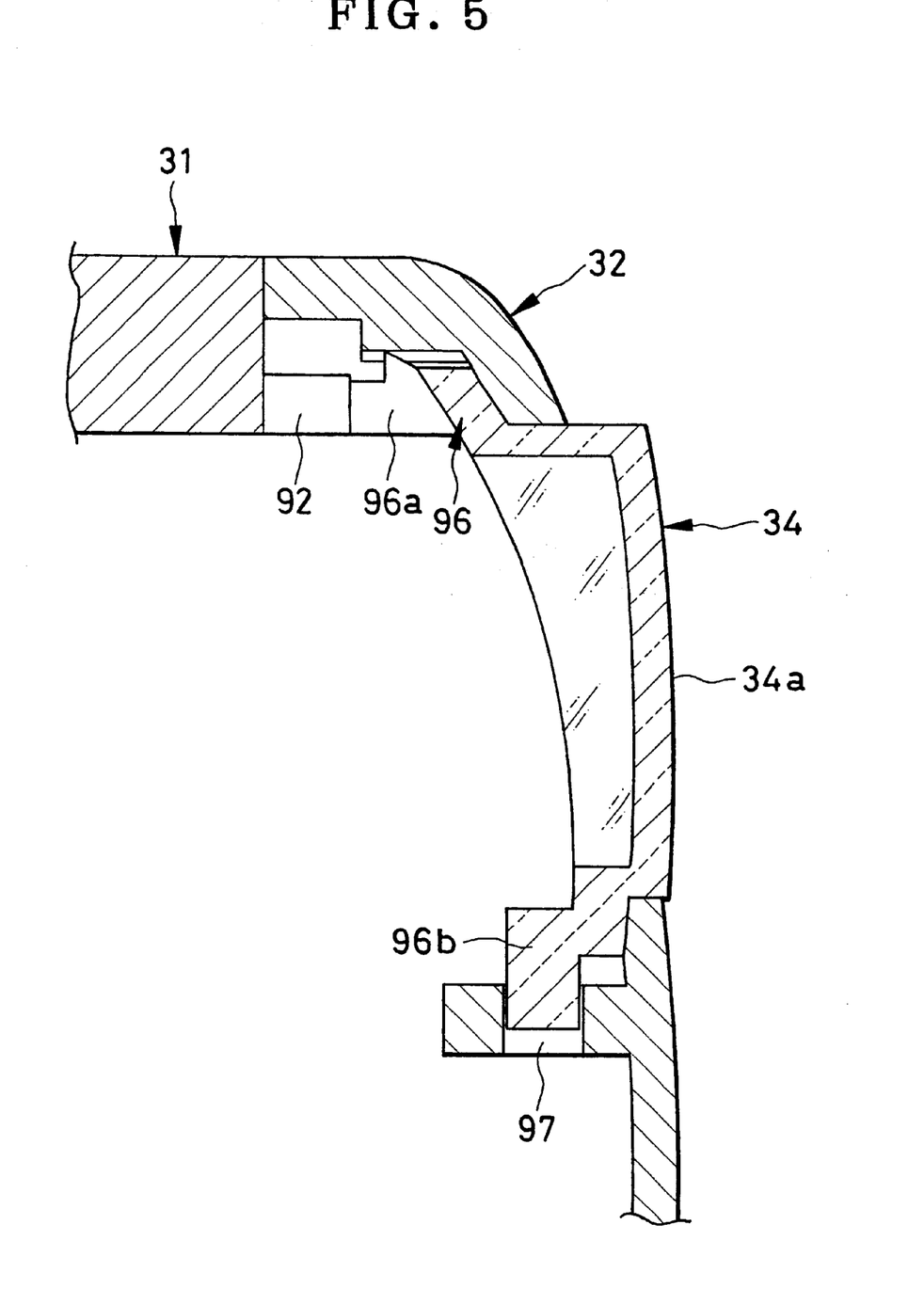
FIG. 5 is a section view showing a method for attaching a diffusion plate.

In FIG. 5, an abutting portion 96 coming into contact with the rear face of the cover plate 32 is formed around a diffusion face 34a of the diffusion plate 34. An upper rear face of the abutting portion 96 is provided with a pressed portion 96a which abuts on the pressing portion 92 to be pressed. Moreover, the bottom of the abutting portion 96 is provided with a projection 96b for fitting into a hole 97 (see FIG. 4) formed under the opening 37. The diffusion plate 34 is embedded in the opening 37 by inserting the projection 96b into the hole 97. When the cover plate 32 is attached to the base member 31, the pressing portion 92 gives a pressure to the pressed portion 96a. Owing to this pressure, the diffusion plate 34 is pressed against the cover plate 32 to be fixed thereto.

As described above, the base member 31 is integrally formed with the pressing portions 91 and 92 for pressing and fixing the diffusion plate 34 and the viewfinder cover 36. Thus, it is unnecessary to individually provide an exclusive member for fixing the diffusion plate 34 and the viewfinder cover 36. Hence, a number of parts is reduced so that manufacture costs are lowered, and at the same time, assembling processes may be decreased.

Figure 6A:
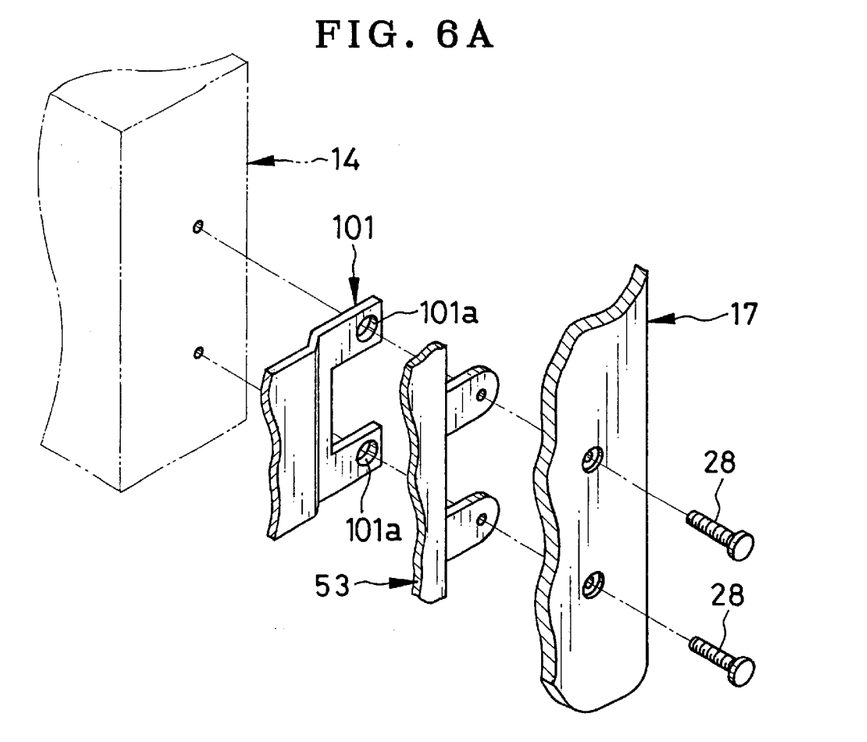
FIGS. 6A and 6B are schematic illustrations showing a method for attaching the front cover and a rear cover to a main body.
Figure 6B:
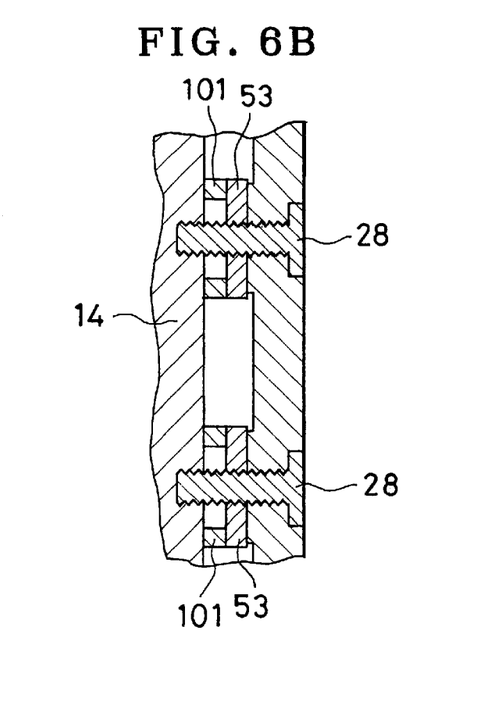

As shown in FIG. 4, the cover plate 32 is provided with a second connector 101 for directly joining with the main body 14. The second connector 101 is a cover-plate connecting flap relative to the main body 14 and is formed with holes 110a through which the screws 28 are inserted. The second connector 101 directly abuts on a side face of the main body 14 (see FIGS. 6A and 6B). Over the second connector 101, the first connector 53 and the rear cover 17 are superimposed in order and are fixed with the screws 28. By directly contacting the second connector 101 with the main body 14, the cover plate 32 is hardly dislocated relative to the main body 14, and attaching accuracy of the cover plate 32 is improved. Furthermore, as described above, the base member 31 and the rear cover 17 directly come into contact with the main body 14 at the other positions to be fixed with the screws so that all of the cover plate 32, the base member 31 and the rear cover 17 are attached with great accuracy.

An operation of the above-mentioned structure is described below. Since the front cover 16 is constituted of the two parts, the base member 31 and the cover plate 32 may have different colors at a stage for designing an exterior of the camera 11. Thus, degree of freedom for external design is improved. Moreover, in virtue of the two-part structure, it is possible to realize a shape that is impossible to be formed under one-part structure. Hence, it becomes possible to attempt discrimination against a competition product. At the same time, it is possible to deal with various requests regarding the design.

In an assembling process for the camera 11, are attached the photographing mechanisms of the zoom lens barrel 13, the viewfinder mechanism, the flash device and so forth to assemble the main body 14. Further, the electronic parts of the flexible circuit board, the liquid crystal panel and so forth are also attached to assemble the main body 14.

Meanwhile, the decorative ring 66 is fixed to the cover plate 32 with the screws, and the diffusion plate 34 and the viewfinder cover 36 are fitted into the respective openings 37 and 38 of the cover plate 32. In this state, the cover plate 32 is attached to the base member 31. The second connection 101 passes through the opening 47 and the cover plate 32 is fitted so as to be adjusted to the ridge 68. The positioning pin 85 and the screw receiving portion 83 are respectively fitted to the positioning hole 84 and the fitting portion 86 of the support portion 46. The claw receiving portion 73 is engaged with the claw of the base member 31. At the same time, the chips 74, 77 and 78 catch the ridge 68 and the front edge of the bottom face 41b. Further, the claws 81 and 82 engage with the frame portion 41. In this way, the cover plate 32 is securely attached to the base member 31.

When the cover plate 32 is attached to the base member 31, the pressing portions 91 and 92 press the respective rear faces of the diffusion plate 34 and the viewfinder cover 36. Owing to this pressure, the diffusion plate 34 and the viewfinder cover 36 are pressed against the cover plate 32 to be fixed thereto. Under this state, the cover plate 32 is fixed to the base member 31 with the screws 87.

Next, the completed front cover 16, the main body 14 and the rear cover 17 are assembled. The front cover 16 is superimposed on the main body 14 from the front thereof, threading the zoom lens barrel 13 through the opening 33. On the other hand, the rear cover 17 is superimposed on the main body 14 from the back thereof. After the front cover 16 and the rear cover 17 have been attached to the main body 14, the rear cover 17 is fixed to the main body 14 with the screws 26 and 27, and the front cover 16 is fixed to the main body 14 by the screws 51 and 52. Successively, the screws 28 are inserted through the rear cover 17, the first connector 53 and the second connector 101 in order. In this way, the front cover 16 and the rear cover 17 are joined to the main body 14 by the screws. After the assembling process, the camera 11 is sent to an examination process, and then is packaged to be shipped.

Although the present invention has been fully described by way of the preferred embodiments thereof with reference to the accompanying drawings, various changes and modifications will be apparent to those having skill in this field.

Therefore, unless otherwise these changes and modifications depart from the scope of the present invention, they should be construed as included therein.

What is claimed is:

1. A camera including a front cover for covering a front face of a main body in which a photographing mechanism is incorporated, said front cover being formed with a first opening, a second opening and a third opening respectively corresponding to a viewfinder, a flash unit and a lens barrel, said front cover comprising:

a cover member formed with said first through third openings; and a base member fitted to side faces of said main body, said base member including a base opening formed in a portion facing a part of said front face of said main body, and a support portion formed at a periphery of said base opening to support an inner face of an edge of said cover member when said cover member is attached to said base member so as to cover said base opening, wherein said base opening surrounds said first, second and third openings of said cover member.

2. A camera according to claim 1, wherein a front face of said base member is provided with a grip for holding said camera.

3. A camera according to claim 1, wherein said cover member comprises:

a cover-member connecting flap for fixing said cover member to said main body.

4. A camera according to claim 3, wherein said cover-member connecting flap directly contacts with a lateral face of said main body.

5. A camera according to claim 4, wherein said base member comprises:

a base-member connecting flap for fixing said base member to said main body, said base-member connecting flap being fixed to said main body in a state of overlapping with an outside of said cover-member connecting flap.

6. A camera according to claim 5, further comprising:

a rear cover for covering a rear face of said main body, a part of said rear cover being overlapped with an outside of said base-member connecting flap to be screwed to said lateral face of said main body.

7. A camera according to claim 1, further comprising:

a viewfinder cover fitted into said first opening from the inside of said cover member; and a first pressure portion provided on said base member, said first pressure portion pressing said viewfinder cover with said cover member.

8. A camera according to claim 1, further comprising:

a window member for flashing fitted into said second opening from the inside of said cover member; and a second pressure portion provided on said base member, said second pressure portion pressing said window member with said cover member.

9. A camera according to claim 8, wherein said cover member comprises:

an engagement hole formed under said second opening, said engagement hole engaging with a projection protruding from a lower edge of said window member.

10. A camera according to claim 1, further comprising:

a decorative ring attached to a periphery of said third opening, said decorative ring guiding said lens barrel when said lens barrel is moved.

11. A camera according to claim 1, further comprising:

a ridge formed at a front edge of said base member, said ridge protruding forward;

a bending portion formed at a lower edge of said cover member and bending toward said base member; and a chip formed on said cover member, said chip catching said ridge with said bending portion.

12. A front cover for covering a front face of a main body, comprising:

a base member attached to said main body and including a frame portion and a support portion, said frame portion being formed with an opening at a place facing said main body, and said support portion being formed at a periphery of said opening; and a cover member for covering said opening, said cover member being supported by said support portion, said cover member dividing said opening of said base member into at least two separate openings, a first of said two separate openings exposing a taking lens on a front face of said main body.

13. A front cover according to claim 13, wherein a second of said two separate openings exposes a viewfinder provided on said front face of said main body.

14. A front cover according to claim 13, wherein a front face of said base member is formed with a grip.

15. A front cover according to claim 13, wherein said cover member divides said opening of said base member into three separate openings, a third of said three separate openings exposing a flash unit provided on said main body.

16. A camera including a front cover for covering a front face of a main body in which a photographing mechanism is incorporated, said front cover being formed with a first opening, a second opening and a third opening respectively corresponding to a viewfinder, a flash unit and a lens barrel, said front cover comprising:

a cover member formed with said first through third openings, said cover member comprises a cover-member connecting flap for fixing said cover member to said main body; and a base member fitted to side faces of said main body, said base member including a base opening, and a support portion formed at a periphery of said base opening to support an inner face of an edge of said cover member when said cover member is attached to said base member so as to cover said base opening.

17. A camera according to claim 16, wherein said cover-member connecting flap directly contacts with a lateral face of said main body.

18. A camera according to claim 17, wherein said base member comprises a base-member connecting flap for fixing said base member to said main body, said base-member connecting flap being fixed to said main body in a state of overlapping with an outside of said cover-member connecting flap.

19. A camera according to claim 18, further comprising a rear cover for covering a rear face of said main body, a part of said rear cover being overlapped with an outside of said base-member connecting flap to be screwed to said lateral face of said main body.

* * * * *